United States Patent
Dempster et al.

(10) Patent No.: US 10,505,748 B2
(45) Date of Patent: Dec. 10, 2019

(54) ENVIRONMENTAL CONTROL FOR HVAC SYSTEM

(71) Applicant: Optimum Energy LLC, Seattle, WA (US)

(72) Inventors: Ian Dempster, Seattle, WA (US); Ben Erpelding, San Diego, CA (US); Clark Mattys, Maple Valley, WA (US); James Hanna, Seattle, WA (US)

(73) Assignee: Optimum Energy LLC, Seattle, WA (US)

(*) Notice: Subject to any disclaimer, the term of this patent is extended or adjusted under 35 U.S.C. 154(b) by 1319 days.

(21) Appl. No.: 14/524,069

(22) Filed: Oct. 27, 2014

(65) Prior Publication Data

US 2015/0045963 A1 Feb. 12, 2015
US 2016/0153675 A9 Jun. 2, 2016

Related U.S. Application Data

(62) Division of application No. 12/874,607, filed on Sep. 2, 2010, now Pat. No. 8,897,921.

(60) Provisional application No. 61/239,199, filed on Sep. 2, 2009.

(51) Int. Cl.
F24F 11/30 (2018.01)
H04L 12/28 (2006.01)
F24F 11/56 (2018.01)

(52) U.S. Cl.
CPC .......... H04L 12/2803 (2013.01); F24F 11/30 (2018.01); F24F 11/56 (2018.01)

(58) Field of Classification Search
CPC ................................. F24F 11/0009
See application file for complete search history.

(56) References Cited

U.S. PATENT DOCUMENTS

2005/0154494 A1* 7/2005 Ahmed ............... G05B 15/02
 700/275
2006/0058922 A1* 3/2006 Kruk ................. G06Q 30/0283
 700/275
2014/0372164 A1 12/2014 Egan et al.
2015/0045982 A1 2/2015 Egan et al.
2015/0293505 A1 10/2015 Gonzalez

* cited by examiner

Primary Examiner — Tejal Gami
(74) Attorney, Agent, or Firm — P.G. Scott Born; Foster Garvey PC

(57) ABSTRACT

A system for controlling energy consumption in a building having a heating, ventilation and air-conditioning (HVAC) which includes using an external application to perform HVAC energy consumption optimization algorithms and other external energy control functions and transmit application control data to a building automation system (BAS), which in turn provides hardware level equipment control for the HVAC system. The external application evaluates equipment data received from the HVAC system by way of the BAS and processes these equipment data to provide application control data back to the BAS. The application control data are calculated to achieve a desired operating efficiency for the HVAC system.

5 Claims, 2 Drawing Sheets

ENVIRONMENTAL CONTROL FOR HVAC SYSTEM

PRIORITY CLAIM

This application is a divisional of and claims priority to U.S. patent application Ser. No. 12/874,607 filed on Sep. 2, 2010, which in turn claimed priority to U.S. Provisional Patent Application No. 61/239,199 filed on Sep. 2, 2009. Thus, the present application also claims priority to and the benefit of the filing date of U.S. Provisional Application No. 61/239,199 filed on Sep. 2, 2009. The subject matter of each of the foregoing applications are incorporated by reference herein in their entireties.

FIELD OF THE INVENTION

The present invention generally relates to systems and methods for externally con trolling energy consumption of a heating, ventilation, and air conditioning (HVAC) system.

BACKGROUND OF THE INVENTION

Controlling the energy consumption of a building, and in particular the energy consumption of an HVAC system, has been achieved through a building automation system (BAS) having software executable algorithms that incorporate numerical constant values corresponding to equipment operating characteristics. FIG. 1 shows a BAS interacting with an HVAC system in which real-tune operating conditions within the HVAC system are sent to the BAS while control settings are received.

The equipment of the HVAC system may include, but is not limited to, chillers, pumps, condensers, boilers, air handlers, heaters, terminal units, etc. The values utilized by the BAS are typically programmed during installation of the HVAC system and set according to the local climate and ambient conditions. These values may be changed periodically by manually evaluating and re-programming the BAS for anticipated changes in the local climate and tenant comfort complaints.

HVAC systems in the past had been designed and installed without energy efficiency in mind. With rising energy costs and more emphasis on protecting the environment, customers are now looking to reduce energy consumption. Other inventions that deal with energy efficiency within HVAC systems take a long time to implement, require large upfront costs, require a large amount of hardware modifications to the original BAS or HVAC system, and require expertise for installation, maintenance, updates, and even customer usage. These conventional systems may require frequent updates and repairs. Customers often need extensive training to perform such updates and repairs themselves. Typically, these systems may also require unique modifications for each different HVAC system, which adds to the cost and complexity of each installation. Further, conventional BASs are generally resource limited in their ability with respect to processing, exchanging and computing data.

BRIEF SUMMARY OF THE INVENTION

A system for controlling energy consumption in a building having a heating, ventilation and air-conditioning (HVAC) is disclosed. The system acts as an external application that interfaces or otherwise communicates with a building automation system (BAS), which in turn communicates with and controls the HVAC system. One objective of the system is to abstract, or logically separate, higher level control functions, like energy optimization, from hardware level control functions to enable more complex control functions and more interaction with external information systems.

The system may solve at least four problems. First, programming the complex logic required to optimize HVAC systems in the BAS reduces reliability and responsiveness of the real-time system. Second, modification to the programming requires modifying the BAS programming and disrupts system operation. Third, operational problem resolution is more difficult with optimization and hardware logic combined. Lastly, if the optimization logic fails, there is no redundancy in the system.

In one aspect of the present invention, an environmental control system for a building includes a heating, ventilation and air-conditioning (HVAC) system controllable to change environmental aspects of the building to target parameters. A building automation system communicates with the HVAC system to adjustably control at least one of the target parameters to a desired value. An external application communicates with the building automation system to evaluate equipment data received from the building automation system and to then process the equipment data to generate application data using an application control sequence. The external application provides the application data to the building automation system for controlling the HVAC system to achieve the desired value of the at least one of the target parameters.

In another aspect of the invention; a method for controlling an HVAC system includes the steps of (1) configuring a building automation system to communicate with an external application; (2) obtaining equipment data from an HVAC system, (3) processing the equipment data with the external application to generate application data; (4) providing the application data to a building automation system; and (5) with the building automation system, directing at least one equipment parameter associated of the HVAC system to a desired value and in accordance with an optimization sequence provided by the external application.

In yet another aspect of the invention, a method for controlling an HVAC system includes (1) configuring a building automation system to communicate with an external application; (2) soliciting equipment data from the building automation system through instructions provided by the application, the equipment data including real-time operating data of the HVAC system; (3) writing the equipment data to specified addresses identified in the application; (4) generating application data with the external application, the application data including desired operating values for the HVAC system; (5) providing the application data to the building automation system from the application; and (6) directing at least one real-time operating parameter sensed in the HVAC system to move toward at least one of the desired operating values generated by the application.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with HVAC systems and individual HVAC components, building climate or environmental control systems, building automation systems (BASs) and various climate control or environmental control processes, parameters, and operations thereof have not necessarily been shown or described in detail to avoid unnecessarily obscuring descriptions of the embodiments of the invention.

One objective of the invention is to separate energy optimization computation from equipment control functions by externally interacting with the BAS of an HVAC system. In one embodiment, an external application is located in a global control device, but could be housed in another hardware device that includes an internal microprocessor. The external application communications with the BAS, which in turn communicates with the HVAC system. The external application runs software subroutines or modules that process real-time HVAC system data and then provides that data to be read by the BAS, which in turn provides instructions to direct various HVAC system components to new or desired set points (e.g., a new temperature setting for a region of the building, a new flow rate for a pump or fan, etc.). One particular embodiment of the external application includes a method for optimizing or at attempting to optimize the overall energy efficiency of the HVAC system by reading, processing and revising various parameters, data, and set points.

In one embodiment, the HVAC system may include chiller plant equipment that is under the control of the BAS. Some of the BAS' responsibilities include equipment control functions: lead/lag changeover, equipment failure monitoring, equipment startup, equipment shutdown, alarms recognition and announcement, and failure changeover sequences of the chiller plant.

Figure 1:
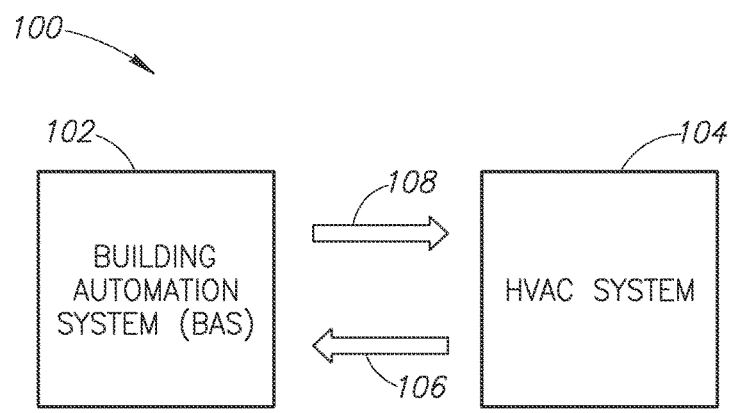
FIG. 1 is a schematic diagram of a building automation system interacting with an HVAC system without an external application according to a conventional environmental control system.

FIG. 1 is provided for purposes of clarity to illustrate an environmental control system 100 that includes interaction between a building automation system (BAS) 102 and an HVAC system 104. The system 100 does not include an external application, so it is therefore consistent with existing or conventional environmental control systems. In operation, real-time operating conditions 106 within the HVAC system 104 are transmitted to the BAS 102 and then control settings 108, also called set points, are controllably transmitted from the BAS 102 to the HVAC system 104. In this system, equipment control functions and optimization functions must be co-mingled in the BAS.

Figure 2:
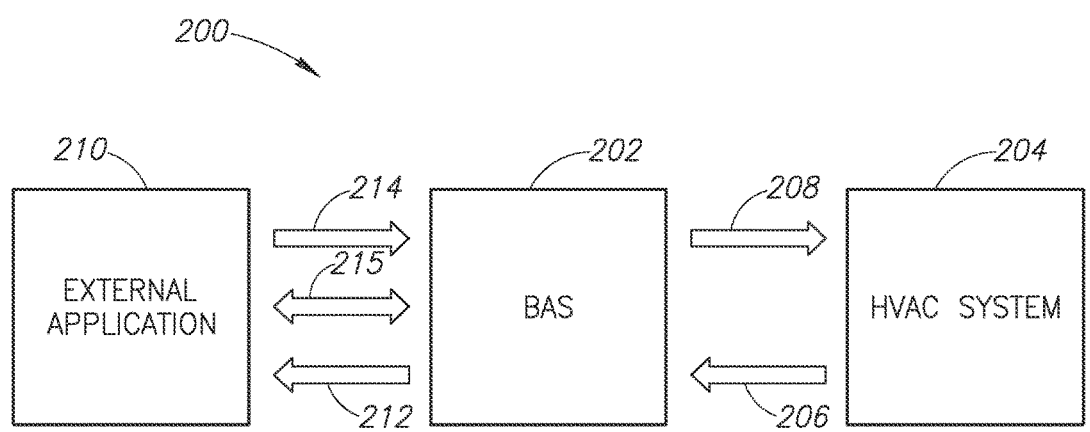
FIG. 2 is a schematic diagram of an environmental control system having an external application in communication with a building automation system to control energy consumption of an HVAC system according to an embodiment of the present invention.

FIG. 2 shows an environmental control system 200 that includes interaction between a BAS 202 and an HVAC system 204 in which real-time operating data 206 within the HVAC system 204 are transmitted to the BAS 202 as described above. The real-time operating data 206 may include equipment operating conditions such as, but not limited to, voltages, speeds, temperatures and pressures, hereinafter referred to as "real-time operating data". In addition, the environmental control system 200 includes an external application 210 configured to communicate with the BAS 202 through a data communication network (not shown). In one embodiment, the interaction between the external application 210 and the BAS 202 is accomplished with a logical interface that allows the external application 210 to interact remotely from the BAS 202 and optionally interact with other BASs. The external application 210 provides application data 214 to the BAS 202. The application data 214 may include operating parameters for the HVAC system 204, for example the application data 214 may indicate which HVAC components should be currently running, at what speeds, etc. Direct (e.g., hardware level) control of HVAC equipment is provided by the BAS 202. The application data 214 provided to the BAS 202 from the external application 210 may preferably include data to vary equipment speeds and define new equipment set points, but additional data may also be provided.

The BAS 202 reads the real-time operating data 206 from the HVAC system 204. The external application 210 interacts with the BAS 202 to achieve energy savings for the HVAC system 204 by receiving equipment data 212 from the BAS 202 and then processing the equipment data 212 using software algorithms that calculate or otherwise determine desired operating settings for the HVAC system 204. To achieve the desired operating settings, the application data 214 is sent from the external application 210 to the BAS 202, which in turn permits the BAS 202 to operate the HVAC system 204 in accordance with the application data 214 provided from the external application 210. By way of example, the BAS 202 operates the HVAC system 204 with controlling instructions 208. In one embodiment, the external application 210 includes a programmable microprocessor unit.

The external application 210 uses three types of data, the equipment data 212, the application data 214, and status data 215 when interacting with the BAS 202. The equipment data 212 includes the real-time operating data 206 as originally provided by the HVAC system 204 and interpretively modified by the BAS 202. The equipment data 212 may take the form of data related to power consumption, equipment speed, supply temperatures, equipment set points, equipment faults, running statuses, etc. The BAS 202 writes the equipment data 212 to the external application 210. The application data 214 includes operating parameters processed by the external application 210 and read by the BAS 202. The application data 214 may then be acted upon within desired operational and/or safety limits defined by the HVAC system 204. The application data 214 may include optimized set points, optimized speed set points, temperature set points, etc. In a preferred embodiment, the equipment data 212 is sent to the external application 210 while the application data 214 is provided by the external application 210. The status data 215 is exchanged between the BAS 202 and the external application 210 so that each has access to the current status of the other. Existing BASs do not have the necessary control logic or computing power to perform like the external application 210, which includes more complex control logic and may require more computing power.

Figure 3:
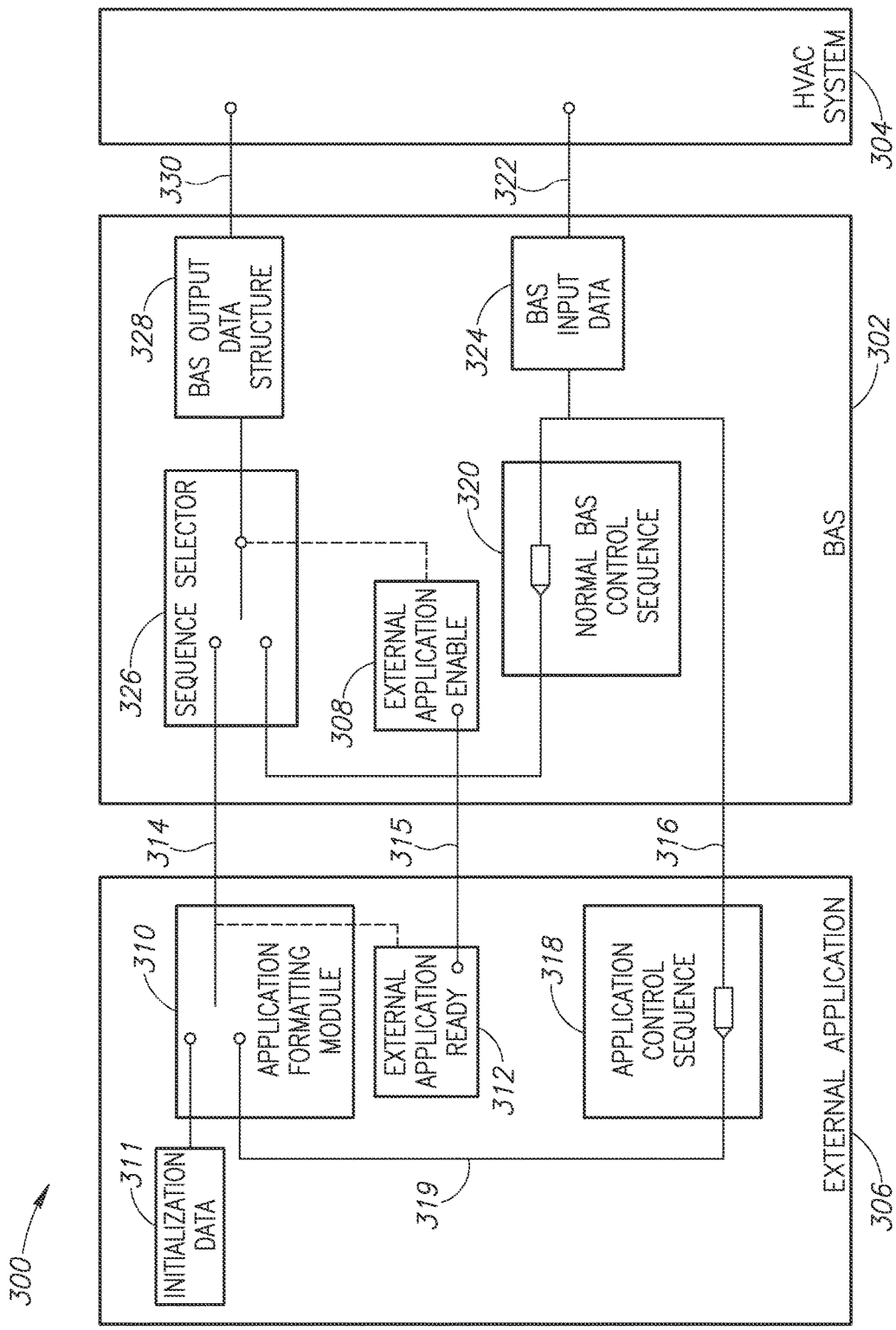
FIG. 3 is block logic diagram of the communications and operation of the environment control system of FIG. 2 according to an embodiment of the present invention.

FIG. 3 shows a logic diagram of an environmental control system 300 for a building or other structure (not shown). The control system 300 includes a BAS 302, and HVAC system 304 and an external application 306.

The BAS 302 reads real-time operating data 322 from the HVAC system 304 and converts the data 322 into BAS input database 324. The BAS input database 324 is directed to both a normal BAS control sequence 320 and equipment data 316 which may take the form of the equipment data described above.

The default BAS control sequence 320 is used to directly control the HVAC system 304 without the external application 306 or when the external application 306 is in a non-operational or non-communicative mode. The sequence 320 is the original control logic sequence that controlled the HVAC system 304 prior to integration of the external application 306 with the BAS 302. Although the sequence 320 may operate the HVAC system 304 in a stable manner, which may include, but is not limited to, a steady state operating configuration, it is appreciated that the sequence 320 may not optimize the efficiency of the HVAC system 304.

The equipment data 316 is utilized by an equipment application control sequence 318 of the external application 306 to process the equipment data 316 and determine desired application settings 319. The desired application settings 319 are formatted by the application formatting module 310 to become application data 314. The application formatting module 310 is triggered based on a signal or data received from an external application ready 312.

By way of example, the external application ready 312 (hereinafter the ready 312) informs the application formatting module 310 whether the external application 306 meets certain criteria such that the ready 312 may then allow the application formatting module 310 to format the desired application settings 319 to the application data 314. The go-ahead criteria for the ready may require that each of the following are met, specifically that (1) the external application is in an operational mode; (2) the external application is in a communications mode with the BAS 302; (3) the BAS is operational; and (4) the BAS 302 expects to receive instructions from the external application 306 to operate.

If the ready 312 determines that the external application 306 is not operational, there is no communication with the BAS 302, or that the BAS 302 does not require the external application 306 to operate, then the ready 312 informs the application formatting module 310 to format the initialization data 311 to application data 314. Thus, the ready 312 determines whether the external application 306 is operational through internal status checks. The ready 312 determines communication with the BAS 302 via the status data 315 and rechecks this status periodically. The ready 312 determines that the BAS 302 requires the external application 306 to operate via the status data 315, which includes a signal from the external application enable 308.

The initialization data 311 may include application settings for operating the HVAC system at a minimum stable level if the application data 314 is utilized by the BAS. The initialization data 311 may be utilized until the external application 306 is ready, until communications between the external application 306 and the BAS 302 are restored, until the BAS 302 expects to receive the application data 314 from the external application 306 to operate, or any combination of the foregoing.

The BAS 302 receives the application data 314 from the external application 306. A sequence selector 326 then determines which of the data sequences (the application data 314 or the normal BAS control sequence 320) to send to a BAS output data structure 328. The sequence selector 326 determines which of the data signals to send, via the external application enable 308. In one embodiment, the external application enable 308 includes an operator defined enable point that permits the operator to manually trigger the control system 300 to indicate that the BAS 302 will be using the external application 306 to operate the HVAC system 304.

If the external application enable 308 informs the sequence selector 326 that the operator defined enable point is enabled, the communication with the external application 306 is operational, and the external application 306 is ready to operate, then the enable 308 it will allow the sequence selector 326 to send the application data 314 to the BAS output data structure 328.

If the external application enable 308 determines that the operator defined enable point is disabled, the external application 306 is not operational, there is no communication with the external application 306, or some combination thereof, then the enable 308 informs the sequence selector 326 to send the normal BAS control sequence 320 to the BAS output data structure 328 as contrasted to sending the application data 314. The BAS output data structure 328 may then convert the received data to control instructions 330, which are then received by the HVAC system 304.

Still referring to FIG. 3, one example of an environment control system includes the external application 306 interacting with the BAS 302 to control a chiller plant (e.g., HVAC system 304). In the BAS 302, an external application enable value within the BAS 302 directs the external application enable 308 that there is a demand for optimized cooling within a building, therefore the enable value is set to TRUE. Next, the external application 306 is instructed that the application data 314 is needed from the external application 306 as processed by the application control sequence 318. The application data 314 may then be processed by the sequence selector 326 and converted to data received by the BAS output data structure 328, which may then be transmitted to the chiller plant 304 as controlling instructions 330 intended to provide an improved optimization sequence to increase an overall operating efficiency of the chiller plant.

When the external application enable value is FALSE, this indicates to the external application 306 that the chiller plant 304 is set to be operated under manual or BAS control, which does not require the processed application data 314 from the external application 306. In such a configuration, the initialization data 311 or other default data accessible by the sequence selector 326 may be processed and transmitted to the BAS output data structure 328, which in turn provides the controlling instructions 330 to the chiller plant 304.

Once the chiller plant is operating at desired efficiency, which may be checked or otherwise verified using the external application, the external application 306 may analyze and determine a required chiller operating parameter within the application control sequence 318 and then transmit processed application data 314 to the BAS 302, which in turn provides controlling instructions 330 to operate the chiller to the desired efficiency or another efficiency as determined by the external application 306. Similarly, after receiving the real-time operating data 322 and converting the same to the equipment data 316, the external application 306 may determine a new chilled water temperature set point. The external application 306 sends the new chilled water temperature set point to the BAS 302 via the application data 314, It is appreciated that the aforementioned data flow may be utilized to provide controlling instructions 330 to other components besides a chiller, for example a boiler, a fan, air handling units, variable air volume units, or any other component of the HVAC system.

In the event there is a loss of communication between the external application 306 and the BAS 302, the BAS 302 may retain the last supplied application data 314 for a desired period of time. After this desired period of time, the BAS 302 may return to the normal BAS control sequence 320 until communication is restored. After communication has been restored and after some additional period of time, the external application 306 may again be brought online to generate new application data 314. The BAS 302 may be configured to smoothly make the transition from the normal BAS control sequence 320 to utilizing the application data 314 in a gradual and efficient manner.

The various embodiments described above can be combined to provide further embodiments. All of the above U.S. patents, patent applications and publications referred to in this specification, as well as U.S. Pat. No. 6,185,946, are incorporated herein by reference in their entireties. Aspects can be modified, if necessary, to employ devices, features, methods and concepts of the various patents, applications and publications to provide yet further embodiments.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for controlling an HVAC system configurable to change environmental aspects of a building to target parameters, the method comprising:
    configuring a building automation system to communicate with an external application, the building automation system having access to a memory;
    obtaining equipment data from the HVAC system;
    processing the equipment data with the external application to generate application data; and
    determining, based on the operating efficiency of the HVAC system, whether to permit the building automation system to control the HVAC system with first control instructions based on the application data provided by the external application or with second control instructions based on information stored in the memory,
    wherein, upon permitting the building automation system to control the HVAC system with the control instructions based on the application data provided by the external application, communication between the external application and the HVAC system includes:
    providing the application data to the building automation system; and
    converting, with the building automation system, the application data to the first control instructions to direct at least one environmental parameter associated with the HVAC system to a desired value.

2. The method of claim 1, wherein processing the equipment data includes operating on the equipment points with the application control sequence of the external application.

3. The method of claim 1, wherein obtaining equipment data includes writing the equipment data to the external application.

4. The method of claim 1, wherein directing at least one environmental parameter associated with the HVAC system to the desired value includes changing a set point value for a component of the HVAC system.

5. The method of claim 1, wherein directing at least one environmental parameter associated with the HVAC system to the desired value includes changing a variable frequency drive speed for a chiller of the HVAC system.

\* \* \* \* \*